(12) United States Patent
Kochman et al.

(10) Patent No.: US 6,403,935 B2
(45) Date of Patent: Jun. 11, 2002

(54) SOFT HEATING ELEMENT AND METHOD OF ITS ELECTRICAL TERMINATION

(75) Inventors: Arkady Kochman, Highland Park; Mikhail Lavit, Itasca; Dmitry Kochman, Vernon Hills, all of IL (US)

(73) Assignee: Thermosoft International Corporation, Buffalo Grove, IL (US)

( * ) Notice: Subject to any disclaimer, the term of this patent is extended or adjusted under 35 U.S.C. 154(b) by 0 days.

(21) Appl. No.: 09/793,485

(22) Filed: Feb. 27, 2001

Related U.S. Application Data

(63) Continuation-in-part of application No. 09/309,917, filed on May 11, 1999, now abandoned.

(51) Int. Cl.$^7$ .............................. H05B 3/34; H05B 3/54
(52) U.S. Cl. ........................ 219/545; 219/212; 219/529; 219/549
(58) Field of Search ........................ 219/529, 544–549, 219/212; 338/208, 210, 211, 275, 262, 258, 259

(56) References Cited

U.S. PATENT DOCUMENTS

| | | |
|---|---|---|
| 1,703,005 A | 2/1929 | Hewitt |
| 2,496,279 A | 2/1950 | Ely et al. |
| 3,349,359 A | 10/1967 | Morey |
| 3,385,959 A | 5/1968 | Ames et al. |
| 3,657,516 A | 4/1972 | Fujihara |
| 3,774,299 A | 11/1973 | Sato et al. |
| 3,935,422 A | 1/1976 | Barnes et al. |
| 4,149,066 A | 4/1979 | Niibe |
| 4,250,397 A | 2/1981 | Gray et al. |
| 4,309,596 A | 1/1982 | Crowley |
| 4,538,054 A | 8/1985 | De La Bretoniere |
| 4,713,531 A | 12/1987 | Fennekels et al. |
| 4,764,665 A | 8/1988 | Orban et al. |
| 4,825,049 A | 4/1989 | Rickborn |
| 4,969,840 A * | 11/1990 | Ii et al. ........................ 439/352 |
| 4,983,814 A | 1/1991 | Ohgushi et al. |
| 5,023,433 A | 6/1991 | Gordon |
| 5,068,518 A | 11/1991 | Yasuda |
| 5,298,722 A | 3/1994 | Tanaka |
| 5,412,181 A | 5/1995 | Giamati |
| 5,801,914 A * | 9/1998 | Thrash ........................ 219/212 |
| 5,824,996 A * | 10/1998 | Kochman et al. ........... 219/529 |
| 5,861,610 A * | 1/1999 | Weiss ........................ 219/212 |
| 6,031,214 A | 2/2000 | Bost et al. |
| 6,229,123 B1 * | 5/2001 | Kochman et al. ........... 219/529 |

* cited by examiner

*Primary Examiner*—Tu Ba Hoang
(74) *Attorney, Agent, or Firm*—Liniak, Berenato, Longacre & White

(57) ABSTRACT

A soft heating element, utilizing electro conductive textile threads as a heating means having additional safety functions as TCO (thermal cut-off) and TSL (temperature self-limiting) devices. The thermal cut-off function is achieved through melting of the electro conductive threads at the temperatures above 120° C. and below 350° C., which results in termination of electrical continuity in the heating element. The temperature self-limiting capability is achieved through a heating thread electrical resistance increase during slow elevation in its temperature, which is below its melting point. Methods of electrical and mechanical connection between heating threads and metal conductors, utilizing winding of connections with flexible strands of fibers or wires, with optional subsequent placement of a rigid mechanical fastener over the winding. Method of providing electrical redundancy of heating circuits by stitching, laminating, weaving or knitting an electrically conductive thread across the multiple runs of the heating thread.

29 Claims, 7 Drawing Sheets

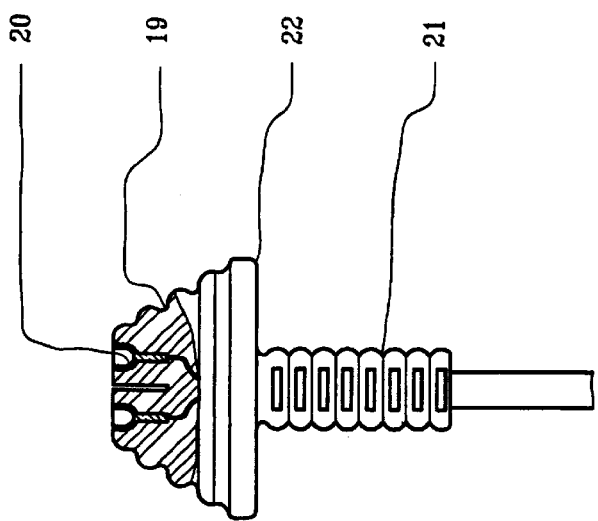
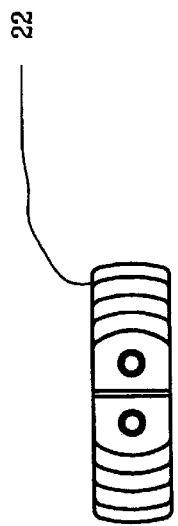
FIG. 6C
FIG. 6E
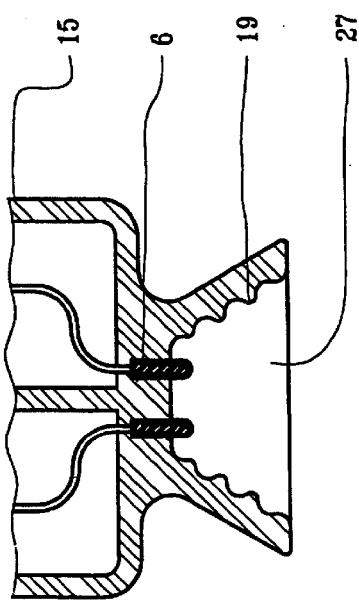
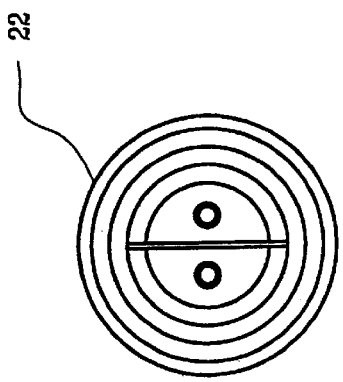
FIG. 6B
FIG. 6D

SOFT HEATING ELEMENT AND METHOD OF ITS ELECTRICAL TERMINATION

This is a continuation-in-part of application Ser. No. 09/309,917 filed on May 11, 1999, now abandoned.

BACKGROUND OF INVENTION

1. Field of Invention

This invention relates to soft and flexible electrical heaters, and particularly to heating elements, including conductive threads/fibers.

2. Description of the Prior Art

Heating elements have extremely wide applications in household items, construction, industrial processes, etc. Their physical characteristics, such as thickness, shape, size, strength, flexibility and other characteristics affect their usability in various applications.

Numerous types of thin and flexible heating elements have been proposed. For example, U.S. Pat. No. 4,983,814 proposed by Ohgushi is based on a proprietary electroconductive fibrous heating element produced by coating an electrically nonconductive core fiber with electroconductive polyurethane resin containing the carbonatious particles dispersed therein. Ohgushi's manufacturing process appears to be complex; it utilizes solvents, cyanates and other toxic substances. The resulting heating element has a temperature limit of 100° C. and results in a pliable but not soft heating element. In addition, polyurethane, used in Ohgushi's invention, when heated to high temperature, will decompose, releasing very toxic substances, such as products of isocyanide. As a consequence, such heating element must be hermetically sealed in order to prevent human exposure to toxic offgassing. Ohgushi claims temperature self-limiting quality for his invention, however "activation" of this feature results in the destruction of the heater. He proposes the use of the low melting point non-conductive polymer core for his conductive fabric-heating element, which should melt prior to melting of the conductive layer, which uses the polyurethane binder with the melting point of 100° C. Thus, the heating element of Ohgushi's invention operates as Thermal Cut Off (TCO) unit, having low temperature of self-destruction, which limits its application.

U.S. Pat. No. 5,861,610 to John Weiss describes the heating wire, which is formed with a first conductor for heat generation and a second conductor for sensing. The first conductor and a second conductor are wound as coaxial spirals with an insulation material electrically isolating two conductors. The two spirals are counter-wound with respect to one another to insure that the second turns cross, albeit on separate planes, several times per inch. The described construction results in a cable, which has to be insulated twice: first, over the heating cable and second, over the sensor cable. The double insulation makes the heating element very thick, stiff and heavy, which would be uncomfortable for users of soft and flexible products such as blankets and pads. The described cable construction cannot provide large heat radiating area per length of the heater, as it would be possible with a strip or sheet type of the heating element. The termination with electrical connectors is very complicated because of stripping two adjacent layers of insulation. In addition, in the event of overheating of a very small surface area of the blanket or pad (for example several square inches), the sensor may fail to sense a very low change in the total electrical resistance of the long heating element due to operating resistance tolerance of the heating cable. In addition, such heating cable does not have Thermal-Cut-Off (TCO) capabilities in the event of malfunction of the controller.

Another prior art example is U.S. Pat. No. 4,309,596 to George C. Crowley, describing a flexible self-limiting heating cable, which comprises two metal conductor wires separated by a positive temperature coefficient (PTC) material. Said heating metal wires are disposed on textile fiber core made of strands of nonconductive fibers coated with conductive carbon. This method has the following disadvantages: The textile fiber core serves only for aligning of metal wire conductors and strengthening of the heating cable. In the event of abnormal overheating, or fire, the destruction of textile fiber core will only increase the possibility of short circuit and fire hazard. In addition, the metal conductor wires have very high melting temperature; therefore they cannot provide TSL or TCO safety functions.

Thrash (U.S. Pat. No. 5,801,914) describes an electrical safety circuit that utilizes a sacrificial fuse filament. Such sacrificial filament is connected to a separate switching circuit, which terminates electrical continuity of PTC heating element in the event of fire hazard. The main disadvantages of this design are (a) the switching circuit deactivates power only after arcing/fire has already started and burned the sensor fiber filament; (b) utilizing of two separate circuits: one for heating, another for fire sensing, significantly increases cost of the products, and (c) addition of sensing sacrificial filament enlarges overall thickness of conventional PTC cable, which originally suffered from excessive stiffniess and bulkiness.

Another prior art example is U.S. Pat. No. 4,969,840 to Li Hidehiro at al, describing an electrical connector for flexible flat cable. Such electrical connector comprises plastic housing having plurality of terminals arranged therein and a removable connector cover mounted on the connector housing. When the flexible flat cable is inserted and the connector cover is pushed into the connector housing, the lock hole of the cable becomes engaged with the projection of the lock plate. The design of the connector has the following disadvantages: (a) the connector cannot be applied for soft cable having unstable shape such as woven textile strips; (b) the housing of connector is complicated and requires cable with special hole in the center, (c) the connectors, cannot provide reliable electrical connection with soft conductors such as electrically conductive textile threads.

The present invention seeks to alleviate the drawbacks of the prior art and describes the fabrication of a heating element, comprising temperature self-limiting (TSL) electrically conductive threads/fibers, which is economical to manufacture; does not pose environmental hazards; results in a soft, flexible, strong, thin, and light-weight heating element core, suitable for even small and complex assemblies, such as handware. A preferred embodiment of the invention consists of utilizing conductive textile threads having Thermal Cut Off (TCO) and/or TSL functions to prevent overheating and fire hazard. Unique methods of electrical termination of conductive textile heating element are also described below.

SUMMARY OF THE INVENTION

The first objective of the invention is to provide a significantly safe and reliable heating element which can function properly after it has been subjected to sharp folding, kinks, small perforations, punctures or crushing, thereby solving problems associated with conventional flexible heating metal wires. In order to achieve the first objective, the electric heating element of the present invention is comprised of electrically conductive textile heating threads/fibers. The conductive heating threads/fibers may comprise carbon or metal microfibers, or textile threads coated/impregnated with, at least one of the following electrically conductive materials: metal, carbon/graphite, carbides, conductive ink, metal sulfides, metal zeolites, metal oxides, metal filled polymers, metal coated nonconductive particles or their combination. The conductive heating threads/fibers possess the following characteristics: (a) high strength; (b) high strength-to-weight ratio; (c) softness, (d) flexibility. The heating element core described in this invention has a shape of electrically conductive strips, sleeves, sheets, ropes or cables, which radiate a controlled heat over the entire heating core surface.

The second objective of the invention is to provide a high level of safety, minimizing the possibility of fire hazard. In order to achieve the second objective: (A) the bus conductors of heating elements may comprise temperature sensitive conductive textile threads/fibers having melting point from 120° C. to 350° C. The melting of the conductive threads/fibers results in complete breaking of electrical continuity in the heating system, or portion thereof, in the event of abnormal local overheating; (B) the heating means comprises electrically conductive threads, which have melting point from 120° C. to 350° C.; and (C) at least bus conductors or heating means may comprise temperature self-limiting (TSL) conductive textile threads. If abnormal overheating occurs in the heating system, and the temperature elevates slowly, reaching the melting point, the TSL threads/fibers, described in this invention, increase their electrical resistance, thus decreasing the outcome power.

Therefore, the proposed bus conductors and/or conductive textile heating means can safely operate both as high temperature TCO (Thermal-Cut-Off) and as TSL devices. The above described TCO and TSL safety functions activate mainly in the event, when normal temperature regulators, such as thermostats or power controllers do not provide sufficient thermal regulation, or malfunction in the heating products.

The third objective of the invention is to provide redundancy of the electrical circuit if necessary. In order to achieve the third objective (A) the heating element core may comprise electrically conductive threads or metal wires bridging the electrical continuity between heating electroconductive threads and (B) the bus conductors, which contain metal wires, may comprise electrically conductive threads, bridging electrical continuity between said metal wires.

The forth objective of the invention is to provide reliable mechanical and electrical connection between heating conductive textile threads/fibers of the heating element and metal wire conductors during electrical termination of the heating products. In order to achieve the forth objective, at least one of the following methods may be applied:

(A) joining of electrically conductive heating threads with lead wires in one bundle, followed by winding, preferably, by thin metal wires or electrically conductive textile threads around such bundle. Nonconductive threads or polymer monofilaments may also be utilized for such winding. A metal crimp, auto splice and/or plastic tie can be placed on the top of such bundle to insure reliable mechanical and electrical connection.

(B) utilizing of telescoping crimping, which comprises steps of: (i) placing of electrically conductive threads between at least two ductile materials, provided that at least one of them has electrically conductive surface, which is in contact with electrically conductive threads, and (ii) crimping of the whole terminal assembly.

The fifth objective of the invention is to provide quick disconnection of the heating element from the electrical power source in order to prevent tripping and injuring of consumers who utilize a heating device according to the preferred embodiment of this invention. Such quick electric power disconnection is extremely important for products utilized in "high traffic" zones, such as heated area rugs and mats, heated chairs and sofas, space radiant heaters and other heating devices requiring an extended electrical cord to reach a power outlet. In order to achieve the fifth objective, the male connector box, having trapezoidal cross section of the cavity is utilized in order to quickly disconnect electrical continuity in the heating element assembly.

The present invention comprises a heating element, containing soft, strong and light electrically conductive textile acting as temperature self-limiting heating media. The heating element is highly resistant to punctures, small perforations, sharp folding and crushing. It can be manufactured in various shapes and sizes, and it can be designed for a wide range of parameters, such as input voltage, desired temperature range, desired power density, type of current (AC and DC) and method of electrical connection (parallel and in series).

BRIEF DESCRIPTION OF THE DRAWINGS

FIG. 6B shows a plan view of connector box, having narrowing cross section of cavity for quick disconnecting of a connector plug in the event of emergency.

FIG. 6C shows a plan view of a connector plug, having narrowing cross section for quick disconnecting from a connector box in the event of emergency.

FIGS. 6D and 6E show different optional shapes of frontal view of the plug.

DETAILED DESCRIPTION OF THE INVENTION

Figure 1:
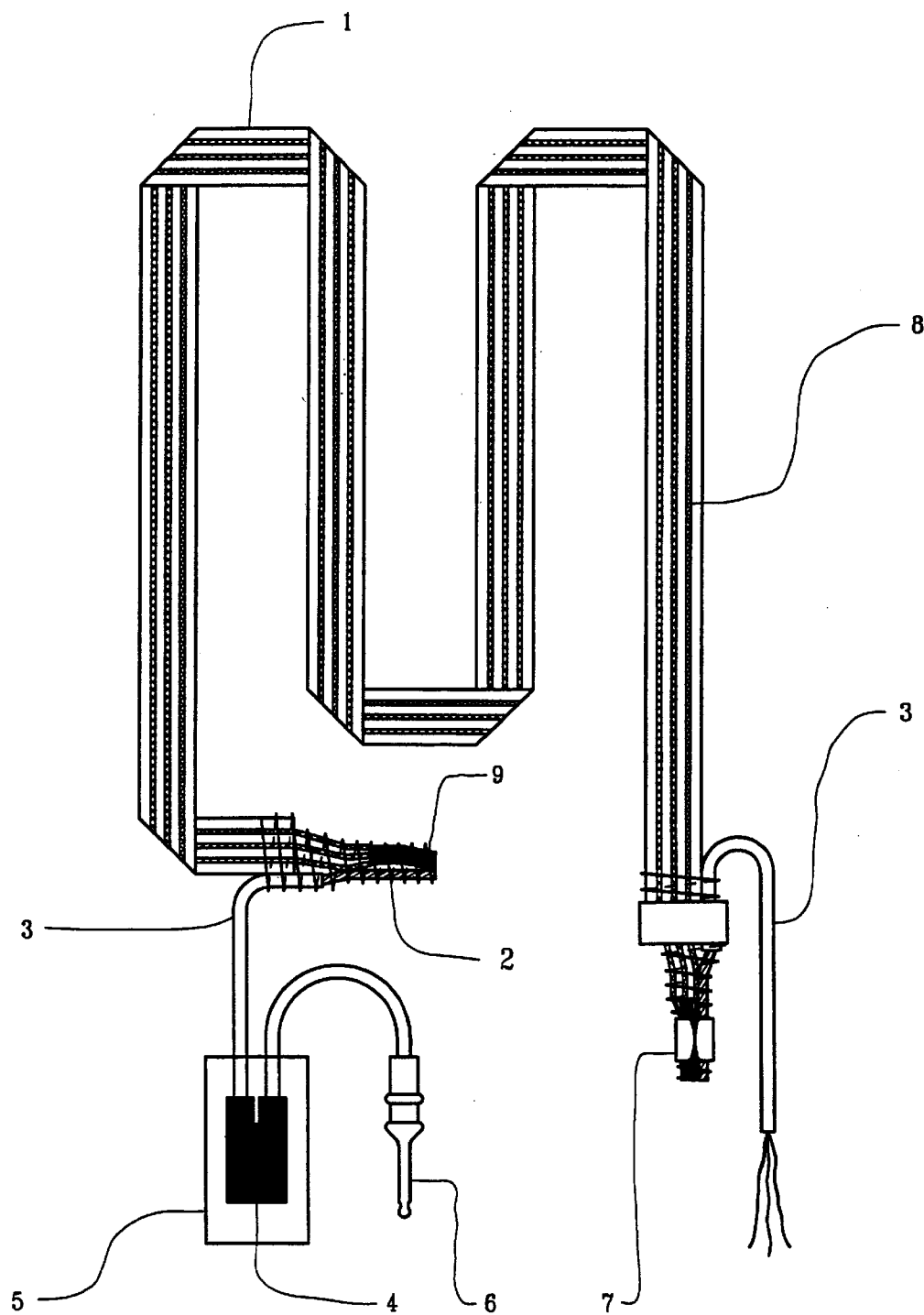
FIG. 1 shows a plan view of a heating element strip laid out to fit the area to be heated, electrically connected in series, and having electrical connections made according to the preferred embodiment of the invention.

The invention consists of a soft heating element core made by the interconnecting of electrically conductive threads/fibers with nonconductive materials. Said core may be assembled as strips, ropes, sleeves, pipes and sheets. The heating element core may contain electrically conducting threads, which are combined with non-conducting yarns/fibers or polymers in various proportion and/or weaving, embroidering, or knitting patterns in order to augment the heating element core electrical resistance.

For convenience of explanation of the invention, the following are the meanings of some terms, utilized in this invention:

1. The term "thread" shall mean stitching thread, knitting thread, and weaving thread or yarn. The thread may comprise continuous and/or non-continuous fibers, at least one monofilament, or combination thereof
2. The terms "metal micro fiber" or "metal fiber" shall mean metal fiber, having denier size of synthetic textile fibers. The diameter of each metal fiber or micro fiber is smaller than the lowest commercially available metal wire Gauge.
3. The term "flexible strand" shall mean, but not limited to, electrically conductive or non-conductive thread, polymer monofilament, metal wire or combination thereof.
4. The term "metal coated thread" shall mean thread comprising fibers or monofilament coated with at least one of, but not limited to the following metals: silver, gold, copper, aluminum, tin, nickel, zinc, cadmium, palladium, lead, their alloys or multi-layer combination. Such coating may be applied to the threads/fibers made of either carbon/graphite, or polymer, or fiberglass, or ceramic or their combination. The coating methods may comprise sputtering, electroplating, electroless deposition, or any other appropriate metal coating techniques.
5. The term "metal containing thread" shall mean thread, which may comprise continuous or discontinuous metal fibers, micro fibers or particles, metal coating or metal containing ink, or combination of the above.
6. The term "conductive ink" described in this invention shall mean either electroconductive ink, or electroconductive polymer, or paint or adhesive, comprising electroconductive media, such as carbon, graphite or metal particles/fibers dispersed in a solution of nonconductive organic material.
7. The term "carbon containing thread" described in this invention shall mean carbon/graphite thread, or fibers coated or impregnated with electrically conductive carbon, carbide or carbon/graphite containing material.
8. The terms "heating means" or "heating media" shall mean electrical resistance material, which is utilized to generate radiant heat, when energized, in the preferred embodiments of this invention.
9. The terms "electrode means", "electrode conductor", "current carrying conductor", or "conductive means" shall mean highly electrically conductive device, which is utilized to conduct electricity and to provide reliable electrical connection with portions of heating means. Conductive or electrode means/conductor may be in the form of bus electrode conductor, electrode terminal, pin connector, electrically conductive fastening means, lead wire or any other low electrical resistance devices.
10. The term "insulating means" shall mean electrically nonconductive material, such as, but not limited to: polymer film or jacketing, ceramic or wooden laminate, woven, knitted or non-woven fabric, nonconductive yarns or fibers.
11. The term "conductive textile" described in this invention shall mean soft electrically conductive textile material comprising electro conductive threads/fibers with or without inclusion of nonconductive materials, such as woven, knitted or non-woven textile/fiber. Conductive textile may comprise electrically conductive threads/fibers incorporated into the textile by stitching/embroidering, weaving or knitting.
12. The terms "fastening means" or "electrode fastening means." shall mean, but not limited to, any kind of metal or polymer auto splice, hollow cylinder, crimping connector, connector pin, staple, thread, plastic tie, any of their combination or any other connection/fastening device appropriate for the purposes of this invention.

The heating element described in this invention may have, but not limited to at least one of the following threads/fibers:

1. Metal coated or impregnated synthetic polymer threads with similar or varying electrical characteristics.
2. Metal coated or impregnated inorganic threads (made of ceramic, fiberceiamic, fiber optic silica or fiberglass fibers) with similar or varying electrical/optical characteristics.
3. Monofilament polymer thread with inclusion of nano-sized metal particles.
4. Threads with similar or varying electrical characteristics coated or impregnated with conductive ink.
5. Metal threads comprising metal micro fibers with similar or varying electrical characteristics.
6. Threads comprising electrically conductive sulfides or zeolites of metals.
7. Threads comprising carbon/graphite or electrically conductive carbides.
8. Threads/fibers, as indicated in 1 through 7 above, with addition of nonconductive polymer synthetic fibers.
9. Threads, as indicated in 1 through 7 above, with addition of nonconductive inorganic, including fiberglass, fibers.

The insulating means of the heating element core may be in a form of weft or warp weaving yarns, knitted yarns, extruded or jacketed insulating polymer, woven or non-woven synthetic fabric or inorganic fibers/textile.

The insulating polymer may be polyvinyl chloride (PVC), silicon rubber, polyethylene, polypropylene, polyurethane, cross-linked polyethylene or cross-linked PVC, or other cable insulating materials. The laminating of the multiple conductive threads/fibers to the non-conductive substrate may be achieved by placing the threads between at least two layers of insulating means and subsequent thermal fusing of the sandwich assembly. It is also possible to utilize adhesive, low temperature melting polymer, embroidering or stitching to laminate electrically conductive and optional nonconductive threads between non-conductive materials.

Figure 2A:
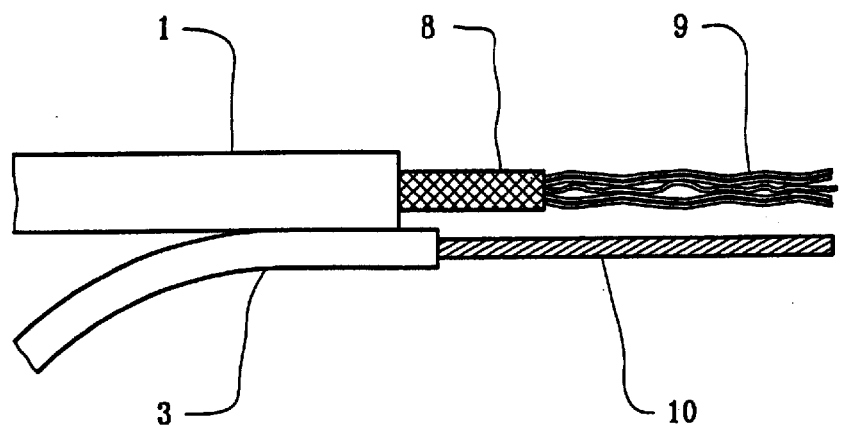
FIG. 2A shows a plan view of a stripped end of the heating element strip, having non-insulated heating threads, attached to a stripped end of the lead wire cable.
Figure 2B:
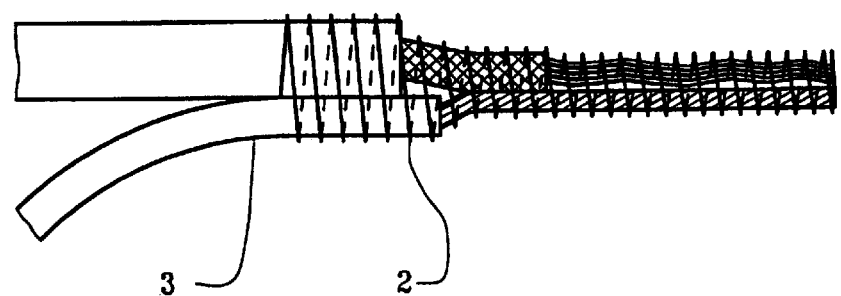
FIG. 2B shows a plan view of a heating strip and lead wire cable with flexible strand wound around non-insulated heating threads and a stripped lead wire.
Figure 2C:
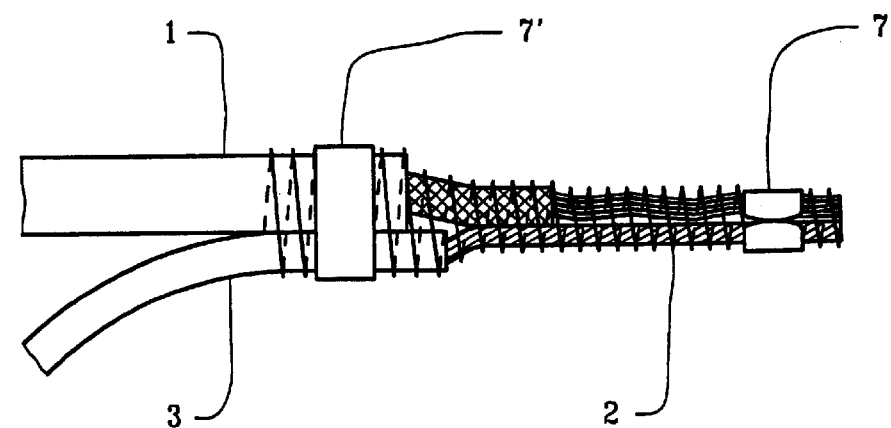
FIG. 2C shows a plan view of metal crimp and plastic tie fastened around heating strip and lead wire cable.

FIG. 1 shows a possible embodiment of the invention where a heating element consists of heating element core (1), having a shape of a strip, which is laid out in a zigzag pattern. The sections of the strip are contiguous to each other. The heating element core consists of a multitude of electrically conductive heating textile fiber threads (9) encapsulated by insulator (8) and, interconnected with non-conductive material. Such placement may be achieved through weaving of electrically conductive threads with nonconductive threads or laminating of conductive threads between at least two layers of insulating material. The ends of the heating element core are stripped in such a way as to remove any insulating materials, including protective coating (8), jacketing or nonconductive fibers (FIG. 2A). The remaining electroconductive heating threads (9) at the end of the heating element core are then joined with the lead wire conductors (3), creating a-bundle of soft electroconductive materials. The next step of electrical termination consists of fastening the bundle of lead wire conductors and heating electroconductive threads by winding with flexible strands around said bundle (FIG. 2B). The flexible strands may comprise electrically conductive materials, such as electroconductive threads or thin metal wires. It is preferable to utilize additional fastening means (7), such as plastic tie, crimp or auto splice to achieve reliable electrical and mechanical connection of the above-described bundle of soft electroconductive materials (FIG. 2C).

An automatic temperature limit control may be accomplished through the use of an optional thermostat (4) placed directly on the surface of the heating element core (1), preferably at the location of a heat concentration, such as connector box, layering or folding of heating element core. In the event of placing thermostat in the connector box, the pin connector (6) may be directly attached to the thermostat by the lead wire. The thermostat may be sealed utilizing waterproof insulating material (5), such as clear PVC tubing.

As an alternative to a thermostat, special temperature sensitive electrically conductive threads or other suitable material can function as TCO safety devices. One, several or all heating threads/fibers may serve this function, depending on the intended use of heater and its design parameters. It is desirable that the limiting (melting) temperature for such TCO threads/fibers be in a range of 120° C.–350° C. This virtually eliminates the possibility for the heating element to become a source of ignition in case of localized overheating, short circuit or other extreme conditions. It is also important to note that melting temperature can be the same or vary for different heating threads/fibers within one heating element core.

Another distinguishing characteristic of electrically conductive heating textile threads/fibers described in this invention is that as the temperature approaches the melting limit, their electrical resistance rises, thus lowering their power output of the heating element. This temperature self-limiting (TSL) capability, described in this invention, is a very important performance and safety feature. TSL prevents abnormal overheating and minimizes situations, when heating element acts like a thermal cutoff (TCO) device, fusing (terminating) the electrical circuit.

It is also preferable to utilize combinations of threads with different thermal characteristics in one heating element core. For example, one heating element strip may contain 3 insulated cables of electroconductive heating threads/fibers, two of which are made of metal coated synthetic threads having a thermal cutoff function, and the third cable made of carbon or metal fibers. The threads of the third cable do not have TCO function and can withstand temperatures, exceeding TCO melting limit of other two cables. In the event all 3 cables have the same electrical resistance, each of them will provide ⅓ of electrical power and heat radiated by the heating element. When the temperature of the heating element slowly reaches TCO temperature limit, then two cables will significantly increase their electrical resistance due to temperature self-limiting (TSL) properties, decreasing the total output heating power. In the event of fast temperature raising, (for example, burning cigarette was dropped on the heating blanket, then the above mentioned two cables immediately melt and open the circuit upon reaching TCO melting temperature limit, reducing the total generating power/current by ⅔. Thus, the heat generated by the system will be significantly reduced in both cases, minimizing fire hazards.

It is also possible to utilize threads/fibers with different thermal characteristics in the same individually insulated cables. For example, the same cable may contain metal-coated synthetic fibers, having TSL and TCO capabilities, and metal or carbon fibers, which have very high temperatures of decomposition.

Another preferred variation of the invention is utilizing of electro conductive heating threads with different TCO and TSL characteristics, so that the threads could activate their safety functions in turn, depending on the level of elevated heat in the system.

Some of the features, such as TCO and TSL are available only in highly specialized, limited and expensive prior art heating elements, and are based on expensive fabrication technologies, which are different than those described in present invention. It is preferable to utilize a heat reflecting layer on one side of the insulated heating element core if dictated by the heating element design; such heat reflecting layer may be an aluminum foil, a metallized polymer, or a non-metal heat reflective substrate, electrically insulated from the electroconductive heating element components.

Another preferred variation of the invention is utilizing of at least one insulated cable, made of metal-coated fiber optic silica threads/fibers. In the event of utilizing of such embodiments, the soft heating strip, shown in FIG. 1, may be used for simultaneous or separate heat, data or/and light transfer.

FIGS. 2A, 2B and 2C show a method of electrical and mechanical connecting of electrode means, comprising metal containing conductor means (3) with heating element core (1) consisting of insulated (8) electrically conductive textile fiber threads (9).

The connection is achieved by tightly winding a flexible strand (2) around the bundle of uninsulated ends of electrode means (3) and heating element core (1). For best results, it is preferred that the flexible strand winding shall extend to the insulated portion of the conductors being joined for a distance sufficient to accommodate optional fastening means (7) placed around it.

The connection assembly is finished by placing fastening means (7) on top of the flexible strand (2) at two locations, in the uninsulated portion of the connection and in the insulated portion of the connection. It is preferable to utilize at least one fastening means in such electrical terminal assembly.

The flexible strand (2), utilized as a winding can be made of a number of materials: electrically conductive and/or electrically non-conductive; monofilament, continuous and/ or discontinuous fiber threads; having flat (tape) and/or circular cross sections, metallic and/or nonmetallic; heat shrinkable or heat stable. Electrically conductive or non-conductive glue may be used to assist in creating a tighter and more durable electrical connection. It is preferable that the flexible strand comprises electrically conductive material.

The completed electrical connection may be then insulated by at least one of the following means: placing in a specially designed section of the connector box, dipping in liquid insulator, insulating by an electrical tape, sealable/shrinkable sleeve, or other means that may offer various degrees of sealing, including waterproof hermetic insulation.

Figure 3A:
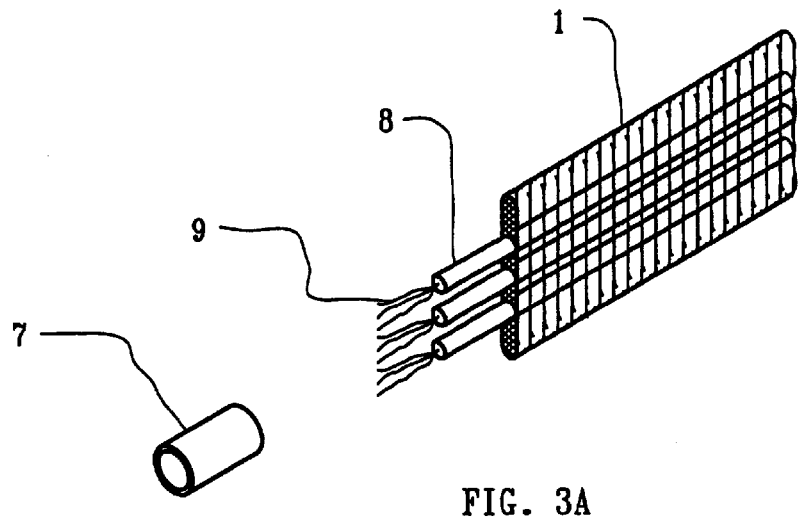
FIG. 3A shows a plan view of a stripped heating element strip and fastening rigid cylinder, having hollow interior.
Figure 3B:
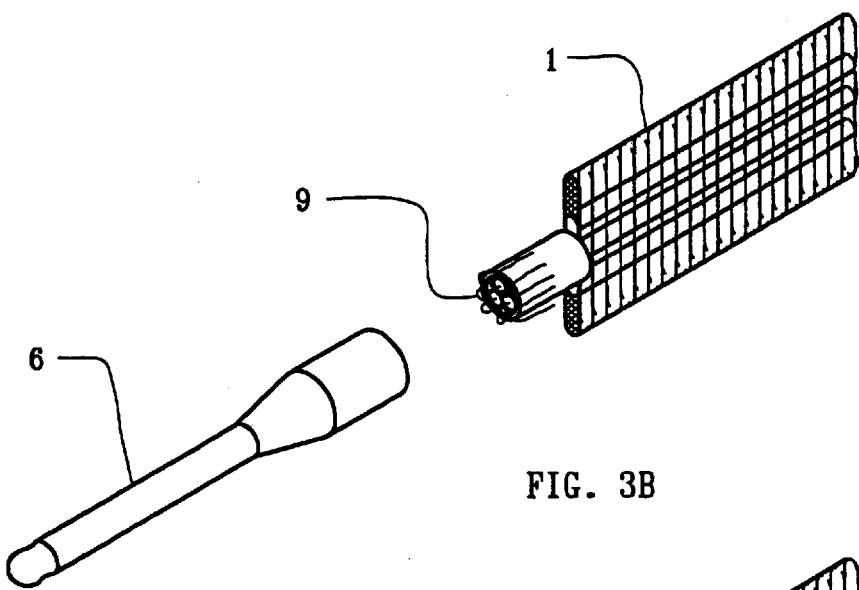
FIG. 3B shows a plan view of a connector pin, having hollow interior and heating element strip with attached fastening rigid cylinder.
Figure 3C:
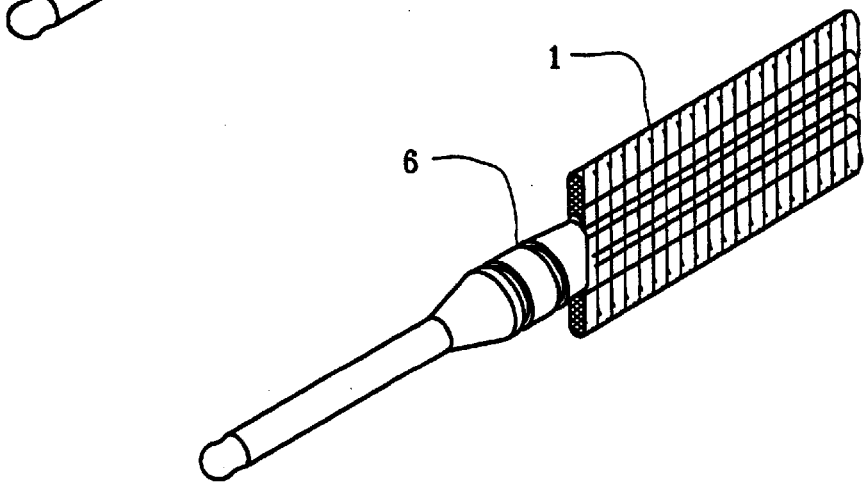
FIG. 3C shows a plan view of a crimped connector pin and heating element strip, according to preferred embodiment of the invention.

FIGS. 3A, 3B and 3C show electrical termination of a soft and flexible heating core (1) with a rigid connector male pin (6). The heating element core (1) comprises electrically conductive heating textile threads (9), encapsulated by insulating means (8).

The termination is achieved by the following steps: (A) threading the uninsulated ends of the heating element core (1) through the fastening means (7), having hollow interior; (B) moving the fastening means (7) over the insulated portion of the heating element core (1); (C) bending the ends of uninsulated heating threads (9) over the edge of the fastening means (7); (D) inserting of the above assembly into the hollow end of the connector pin (6); and (E) crimping of the connector pin to provide secure mechanical connection and effective electrical continuity. It is important to bend the uninsulated electrically conductive textile heating threads (9) to an angle of at least 90° over the fastening means (7). The fastening means (7) may be made of metal or polymer. It is preferable, however, that at least its outer surface be electrically conductive.

Figure 4A:
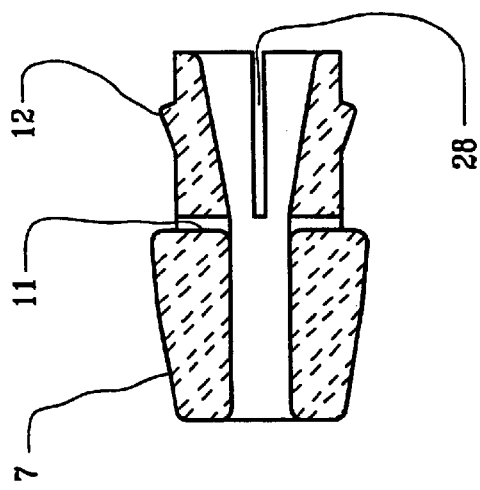
FIG. 4A shows cross sections of rigid connector pin, fastening means, having hollow interior and cable/threads compression/locking mechanism.
Figure 4A:
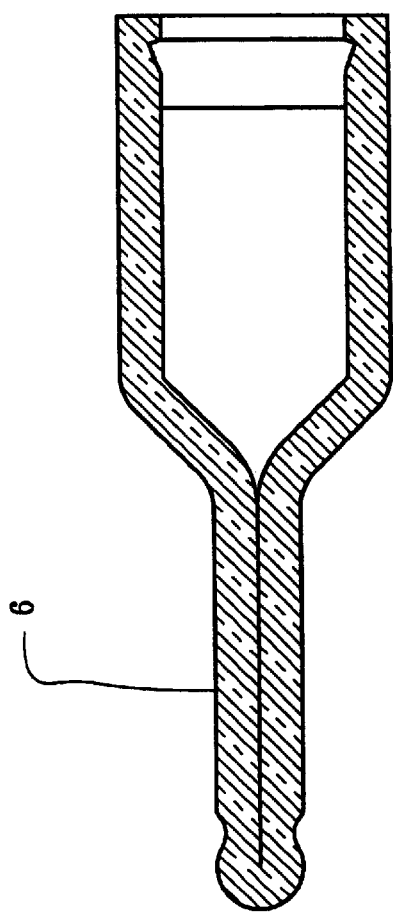
Figure 4B:
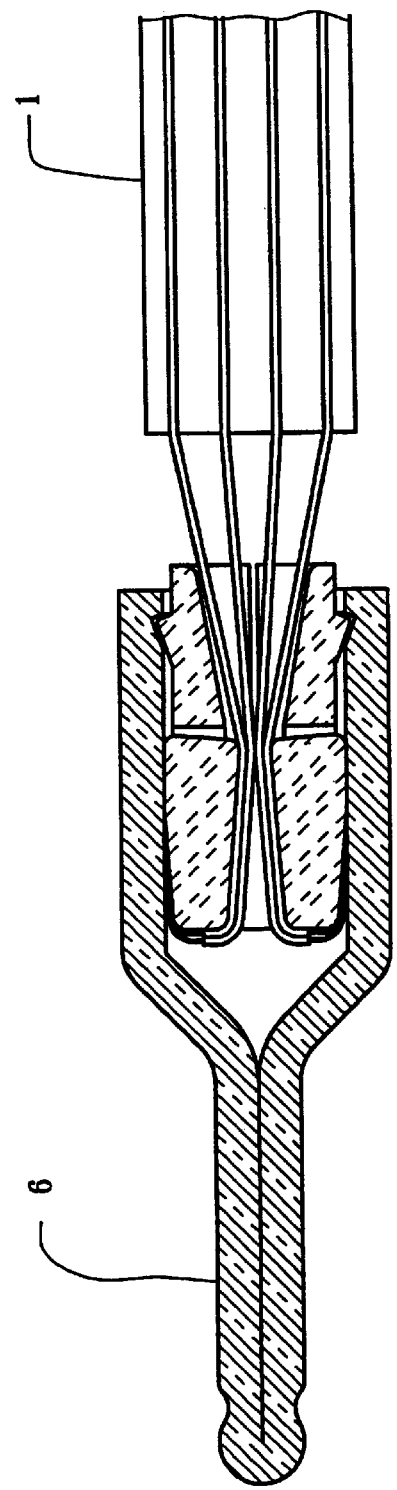
FIG. 4B shows a plan view of electrical termination of the heating tape by the fastening means, having a hollow interior and cable/threads compression/locking mechanism.

The FIGS. 4A and 4B describes an optional electrode assembly design which may include special elements of the fastening means, such as lock stud (12), spring lock slot (28), and flexible compression lock (11). These resilient elements allow locking of fastening means (7) upon its insertion into the connector pin (6), at the same time compressing the heating cables and heating threads inside the whole electrode assembly.

The fastening means (7) and the connector pin (6) assembly may be so designed that angle to which the ends of the heating threads of the heating element strip (1) shall be bent at least 90°. Pin (6) may take various forms, including a female connector, threaded connector, or any other known type of termination or connection.

Figure 5:
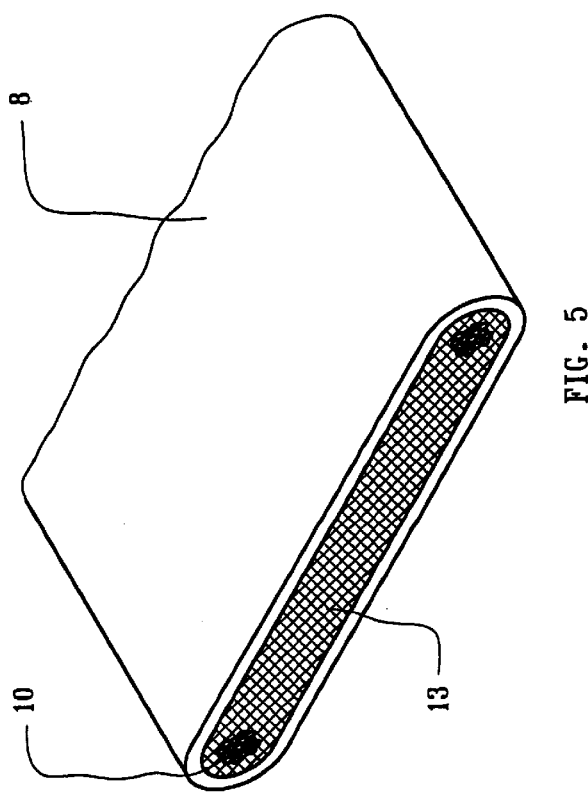
FIG. 5 shows an isometric view of a heating cable consisting of two energizing bus electrodes interconnected with positive temperature coefficient (PTC) or other semi conductive materials, provided that at least one bus electrode comprises Thermal Cut-Off (TCO) electrically conductive textile threads.

FIG. 5 shows a flexible heating element consisting of two bus electrode conductors (10) embedded into a PTC or other semi conductive material (13), with the whole assembly insulated by insulating means (8). At least one of the bus electrode conductors (10) comprises conductive textile threads with predetermined melting point, which impart TCO (thermal cut-off) and TSL (temperature self limiting) attributes to the cable, as enhanced safety features. Therefore, the heating element described here, may have three levels of user protection: PTC material, TSL and TCO feature of threads, containing in the conductor means (10). These features of the cable virtually eliminate the possibility of ignition under electrical load, which is known to happen with PTC cables of prior art.

An alternative embodiment of the invention may be utilizing of at least one bus conductor, made of metal-coated fiber optic silica strands. In the event of utilizing of such embodiments, the flexible heater, shown in FIG. 5, may be used for simultaneous or separate heat, data or/and light transfer.

Figure 6A:
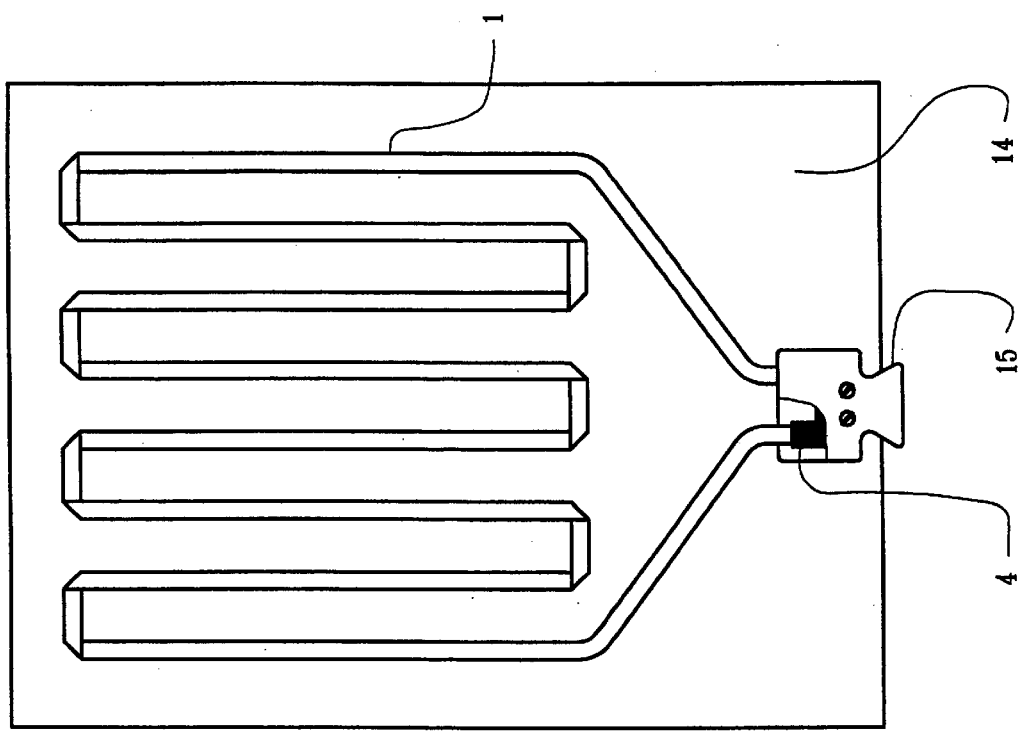
FIG. 6A shows a plan view of a heating device having quick connector box according to preferred embodiment of this invention.

FIG. 6A shows a heating appliance, consisting of heating element strip (1), connected with optional thermostat (4) and plug connector box (15). It is preferable to place the thermostat on the top of at least one heating element strip in order to provide high thermal sensitivity of thermostat in the connector box.

FIG. 6B shows a cross section of connector box (15) equipped with a quick disconnect feature consisting of a cavity (27), having a narrowing cross section and connector pins (6) at the cavity base. The cavity may also have optional locking grooves (19).

It is important to note that in order to enable quick disconnection of electrical continuity in the heating element, the cavity cross section (27) of the connector box (15) may narrow down from the opening of the cavity cross section (27) to the location of the inside cavity base.

FIG. 6C shows a matching quick disconnect plug (22), having a narrowing cross section, with connectors (20) at its open end. The non-parallel surfaces of the plug are equipped with optional locking grooves (19). A flexible insulated cord (21) is attached to the plug.

The above described "narrowing" cross sections of the connector box cavity and of the plug may have any non-parallel shapes, including trapezoidal, circular, oval or elliptical.

When the plug (22) is fully inserted into the quick connector box's cavity (27), the optional locking grooves (19) provide an effective mechanical and electrical connection. If a force, beyond a predetermined safe force limit, is exerted on the connection, the grooves would unlock and the electrical and the mechanical connections would be terminated. Because the grooved surfaces of each part of the device are non-parallel, the unlocking of them will create an immediate termination of the mechanical connection, without the possibility of slippage.

At least one of the grooved components of the quick disconnect plug shall be made of or coated with non-rigid material, such as rubber or soft PVC. This will allow for ease of insertion and tightness of the connection.

FIGS. 6D and 6E demonstrate variations of the front view of the plug (22). Depending on the final use of the heating appliance, the shape of the cross-section of the quick disconnect plug may vary from circular (FIG. 6D), oval, elliptical, to rectangular (FIG. (6E), and from bulky to slim.

The quick disconnect type plugs of this design may be used in various types of heating appliances, utilized in, but not limited to bedding, floor covering, garments, industrial applications, medicine, health care, military, household use, automotive and marine applications, and personal care items.

Figure 7A:
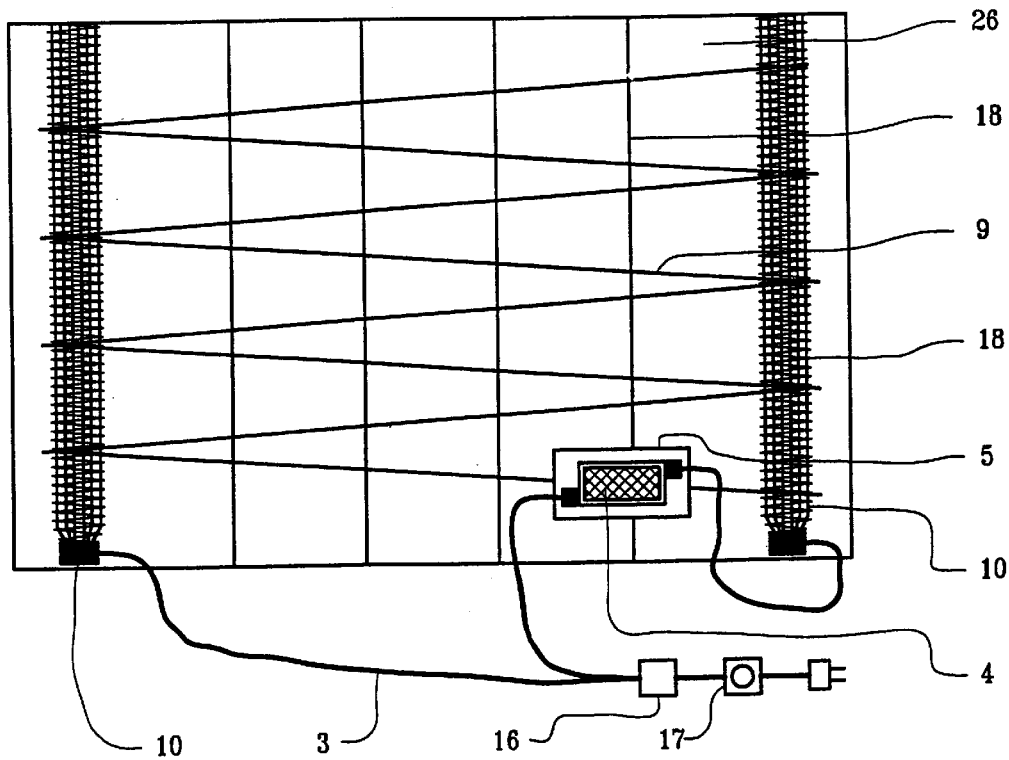
FIG. 7A shows a heating device, utilizing heating textile threads, connected in parallel, electrode means and redundant circuits according to the preferred embodiment of the invention.

FIG. 7A shows a heating device, having electrical connection in parallel, comprising electrically conductive heating fiber threads (9) that are incorporated into electrically nonconductive woven or non-woven textile fabric base (26), preferably by stitching or embroidering.

The energizing electrode means (10) are placed, stitched or woven at predetermined locations to act as bus conductors of the heating element. The heating threads (9) may be stitched through the busses and the fabric (26) in such a way so to create a parallel electrical connection between the busses. Electrically conductive thread (18) is used to stitch through the busses to provide reliable mechanical and electrical connection between the busses and heating threads (9). It also serves as a redundant electrical means, which provide redundant circuitry for bus electrodes (10) and heating threads (9).

An electrical redundancy of the heating element threads (9) may be achieved within the field of the heater by stitching, laminating, knitting or weaving of additional electrically conductive threads (18) or wires over the multiple runs of the heating threads, thus bridging them. Both, the threads (18) and the heating threads (9) may have thermal fuse (TCO) and TSL functions.

The heating cycle is controlled by optional thermostat (4), placed on top of the heating element and concealed within hermetically sealed enclosure (5); step-down transformer/rectifier (16); and controller (17). The electrode means (10) are electrically energized through lead wires (3).

Figure 7B:
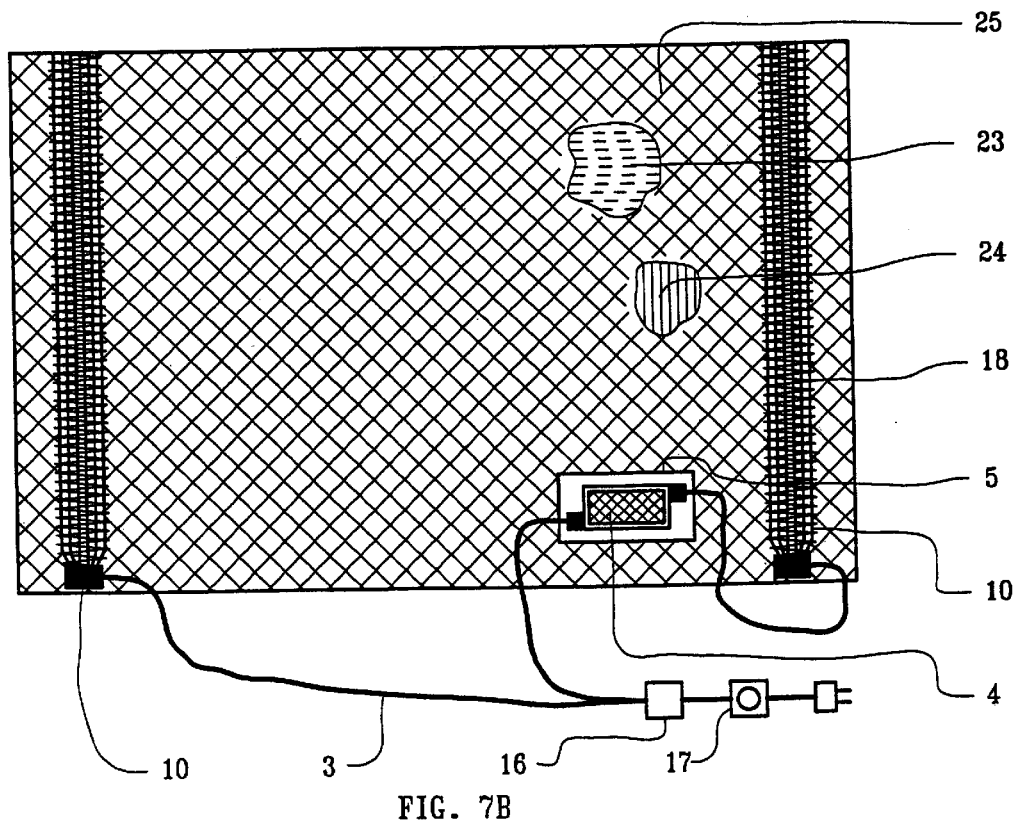
FIG. 7B shows a heating device, utilizing temperature self-limiting heating conductive textile, which has localized fused (TCO) and TSL spots after abnormal overheating of the heating product.

FIG. 7B shows heating element, comprising woven or knitted electrically conductive textile (25) which, by virtue of its composition, acts as TCO device by fusing its local spot (23), upon reaching its melting point and as TSL device, by increasing its resistance in the localized spot (24), with increase of temperature. Such TSL and TCO spots may appear in the heating products during abnormal use of the heating products. As an example, such spots may appear during abnormal overheating of an electrical heating blanket, resulted from abuse, such as vigorous twisting, folding, accompanied by compressing, when the electrical blanket is turned on. Usually, under normal operating conditions, thermostats, power controllers or other temperature discrete devices, prevent products from localized overheating. However, in the event of malfunction of such temperature controlling devices, or in the event of abuse of the heating products, the inherent safety TSL and TCO features of the conductive textile itself become very critical. The FIG. 7B demonstrates heating element, having overheated localized TSL (23) and TCO (24) spots appeared after activating their thermal protection features, thus providing that the heating product has failed safely without arcing or fire hazard.

It is important to note that conductive threads/fibers can be laminated onto at least one layer of substrate material consisting of woven or non-woven fabric, polymer, foil or other suitable substrate. The proposed soft heating elements may be utilized in a variety of commercial and industrial heater applications, utilizing direct or alternating current. The main advantage of these heating elements is the high reliability, which is provided by the soft and durable electrically conductive threads.

The process of manufacturing of the heating elements can be fully automated, it utilizes commercially available nontoxic, nonvolatile and inexpensive products. Some designs of the insulated heating core may be manufactured in rolls or spools with subsequent cutting to desired sizes and further attachment of electric power cords and optional power control devices.

Further, the use of electrically conductive temperature self-limiting threads has the following additional advantages:

it enables manufacturing of thin, flexible and soft heating devices, it provides high durability of the heating appliances which can withstand sharp folding, small perforations, punctures and compression without decreasing of electrical operational capabilities;

it provides high tear and wear resistance owing to: (a) high strength of the conductive threads, combined with strong non-conductive fibers and (b) tight interconnecting of electrically conductive media with strong insulating materials;

it provides for manufacturing of corrosion and erosion resistant heating element owing to: (a) high chemical inertness of the optional carbon coated inorganic threads and ceramic yarns, (b) optional hermetic polymer insulation of the whole heating element, including electrode connections and temperature control devices, for utilization in chemically aggressive industrial or marine environments;

it offers versatility of variation of the electrical conductivity of the heating element core because of: (a) weaving, knitting, stitching/embroidering, laminating or stranding of the conductive threads/fibers to the predetermined width and thickness of the strips, sleeves, ropes or sheets; (b) weaving or knitting of the threads to the predetermined density or type of weaving/knitting; (c) weaving, knitting, or stranding of the optional individually insulated conductive threads/fibers or metal wires having different electrical conductivity in one unit; (d) weaving, knitting, laminating, stitching/embroidering or stranding of the conductive threads/fibers with nonconductive ceramic and/or polymer threads or fibers;

it offers high degree of safety owing to temperature self-limiting (TSL) and TCO nature of the electrically conductive threads.

it provides for saving of electric power consumption owing to: (a) installation of heat reflective layer and (b) possibility of placing the heating element, due to low temperature density, with less cushioning and insulation closer to the human body or to the surface of the heated object;

it allows for manufacturing of heating element with electrical connection of electrically conductive strips, sheets, sleeves/pipes or ropes in parallel or in series;

it overcomes the problem of overheated spots because of (a) high heat radiating surface area of the heating element core, (b) uniform heat distribution by the heat reflective layer, reducing the possibility of skin burns or destruction of the insulating layers;

it provides for extremely low thermal expansion of the heating element because of the nature of the electrically conductive heating threads, polymer or nonconductive yarns/fibers. This feature is extremely important for construction applications (Example: concrete) or for multi-layer insulation with different thermal expansion properties;

it offers high degree of flexibility and/or softness of the heating appliances, depending on the type and thickness of insulation; and it provides technological simplicity of assembling and electrical termination of said heating elements.

Further, the proposed heating elements can be utilized in, but not limited to: (a) electrically heated blankets, throws, bed covers, pads, mattresses, spreads, area rugs and carpets; (b) walls, office dividers, window blind vanes, mirrors, fan blades, furniture, ceiling and floor electric heaters; (c) any vehicle, scooter, motorcycle, boat, snowmobile and aircraft heaters; (d) electrically heated safety vests, garments, boots, gloves, hats and scuba diving suits; (e) food (Example: pizza) delivery and sleeping bags; (f) refrigerator, road, gutter, roof and aircraft/helicopter wing/blade deicing systems, (g) pipe line, drum and tank electrical heaters, (h) electrical furnace igniters, (i) health care applications, surgical and post-op heaters, infant care, heat-healing devices, heated patient bedding, chairs, pads, etc.

In addition to the heating application, the same conductive textile heating element core may be utilized for (a) an anti-static protection, (b) electro magnetic interference protection, or (c) as a flexible antenna for wireless communication. Further, the electro conductive heating threads, separated by non-conductive material, by virtue of their chemical and physical composition, may function as a photovoltaic (solar sell) device.

The aforementioned description comprises different embodiments, which should not be construed as limiting the scope of the invention but as merely providing illustrations of some of the presently preferred embodiments of the invention. Additional contemplated embodiments include: (a) heating element core may include threads comprising ceramic fibers, such as alumina, silica, boria, boron nitride, zirconia, chromia, magnesium, calcia, silicon carbide or combination thereof; (b) heating element core may comprise electrically conductive carbon/graphite or metal coated/impregnated ceramic fibers, such as alumina, silica, boria, zirconia, chromia, magnesium, calcia, silicon carbide or combination thereof; (c) the fastening means, having hollow interior may have any shape, including oval, elliptical or rectangular; (d) flexible strands for winding the terminal connection may comprise metal fibers or metal micro fibers; (e) the heating element assembly may comprise the conductive strips, sleeves/pipes, sheets or threads, having different electrical resistance; (f) the heating element core may be formed into various patterns such as serpentine or other desired patterns, including ordinary straight, coil or "U" shaped forms; (g) the electric power cord can be directly attached to the conductive heating element core without the use of terminals/electrodes, it is possible to utilize electrically conductive adhesive, conductive paint, conductive polymer, etc. to assure good electrical connection; (h) the conductive heating element core or individually insulated conductive threads/fibers in the heating element core can be electrically insulated by the soft non-conductive fabrics or polymers by sewing, gluing, fusing, spraying, extruding, etc., forming a soft multi-layer assembly; (i) the shape holding means can be applied on any part of the heating element core; (j) the electrically conductive threads can be applied on, or laminated between color/temperature sensitive fabric or polymer to vary the color of this fabric/polymer by the heat.

While the foregoing invention has been shown and described with reference to a number of preferred embodiments, it will be understood by those possessing skill in the art that various changes and modifications may be made without departing from the spirit and scope of the invention.

What is claimed is:

1. A soft and flexible heating element having a durable construction for incorporation into a plurality of articles, said heating element comprising:
    a conductive textile comprising at least one electrically conductive heating textile thread as temperature self limiting heating means; said at least one heating textile thread, melts at the temperatures above 120° C. and below 350° C., which terminates electrical continuity in said temperature self limiting heating means.

2. The soft heating element according to claim 1, further including electrically redundant means for providing redundant electrical circuits in said heating element.

3. The soft heating element according to claim 2, wherein said electrically redundant means comprise electrically conductive textile threads bridging electrical circuits between said at least one heating textile thread in said heating element.

4. The heating element according to claim 1, further comprising an electrical connection comprising at least one flexible strand, wound around a bundle, made by joining of said at least one heating textile thread with at least one metal containing conductor means.

5. The heating element according to claim 4, wherein said flexible strand comprises nonconductive textile fiber thread.

6. The heating element according to claim 4, wherein said flexible strand comprises electrically conductive textile fiber thread.

7. The heating element according to claim 4, wherein said flexible strand comprises metal wire.

8. The heating element according to claim 4, wherein said flexible strand comprises monofilament polymer strand.

9. The heating element according to claim 4, further including fastening means, placed around said electrical connection to enhance mechanical and electrical connection in said bundle.

10. The heating element according to claim 1, further comprising at least one temperature sensing discrete device, attached to the surface of said heating element in the location of enhanced heating.

11. The heating element according to claim 10, wherein said location of enhanced heating comprises plastic housing.

12. The heating element according to claim 1, further comprising at least one electrical connector box to enable quick disconnection of electrical continuity in said heating element, providing that the at least one cavity cross section of said connector box narrows down from the opening of said cavity cross section to the location of the inside base of said cavity cross section of the connector box.

13. A flexible heating element having a durable construction for incorporation into a plurality of articles, said heating element comprising:
    at least one flexible bus electrode conductor comprising at least one electrically conductive temperature self limiting textile thread as conductive means; said at least one electrically conductive textile thread melts at the temperatures above 120° C. and below 350° C., which terminates electrical continuity in said bus electrode conductor.

14. The flexible heating element according to claim 13 further comprising electrical connection comprising at least one flexible strand wound around said bus conductor and at least one metal containing conductor to provide reliable electrical and mechanical connection between said bus electrode conductor and said at least one metal containing conductor.

15. The heating element according to claim 14, wherein said at least one flexible strand comprises nonconductive textile fiber thread.

16. The heating element according to claim 14, wherein said at least one flexible strand comprises electrically conductive textile fiber thread.

17. The heating element according to claim 14, wherein said at least one flexible strand comprises metal wire.

18. The heating element according to claim 14, wherein said at least one flexible strand comprises monofilament polymer strand.

19. The flexible heating element according to claim 14, further including fastening means, placed around said electrical connection to enhance its mechanical and electrical properties.

20. A method for providing reliable mechanical and electrical termination of the soft heating element according to claim 1, said method comprising the steps of:
    joining at least one uninsulated current carrying conductor and said electrically conductive heating textile thread together into at least one bundle;
    winding at least one flexible strand around said at least one bundle to provide reliable mechanical and electrical connection between said electrically conductive heating textile threads and said at least one current carrying conductor.

21. The method for providing reliable mechanical and electrical termination of said soft heating element according to claim 20, wherein said at least one flexible strand comprises nonconductive textile fiber thread.

22. The method for providing reliable mechanical and electrical termination of said soft heating element according to claim 20, wherein said at least one flexible strand comprises electrically conductive textile fiber thread.

23. The method for providing reliable mechanical and electrical termination of said soft heating element according to claim 20, wherein said at least one flexible strand comprises metal wire.

24. The method for providing reliable mechanical and electrical termination of said soft heating element according to claim 20, wherein said at least one flexible strand comprises polymer monofilament strand.

25. The method for providing reliable mechanical and electrical termination of said soft heating element according to claim 20, further including step of placing a fastening means around said at least one bundle.

26. A method of joining electrode fastening means with the soft heating element recited in claim 1, said method comprising the steps of:

inserting uninsulated ends of said at least one electrically conductive thread into electrode fastening means having a hollow interior;

joining said electrode fastening means with at least one additional electrode fastening means having another hollow interior, so that said at least one electrically conductive thread are disposed between surfaces of at least two of said electrode fastening means.

crimping of said electrode fastening means to provide reliable mechanical and electrical contact between said electrically conductive threads and said electrode fastening means.

27. The method of joining electrode fastening means with soft heating element according to claim 26, wherein at least one surface of said electrode fastening means is electrically conductive.

28. The method of joining electrode fastening means with soft heating element according to claim 26, wherein at least one said electrode fastening means comprises plastic material.

29. The method of joining electrode fastening means with soft heating element according to claim 26, wherein said step of joining of said electrode fastening means with at least one additional electrode fastening means, having hollow interior, comprises step of folding of said uninsulated ends of electrically conductive threads to an angle of at least 90° after insertion them into said electrode fastening means.

* * * * *